United States Patent
Dudding et al.

(10) Patent No.: US 6,616,156 B1
(45) Date of Patent: Sep. 9, 2003

(54) STEERING KNUCKLE

(75) Inventors: Ashley Thomas Dudding, Plainfield, IL (US); Michael John Gottschalk, Granville, OH (US); Lawrence Edward Miller, Naperville, IL (US); Rodolfo Rosales, Jr., Aurora, IL (US)

(73) Assignee: The Boler Company, Itasca, IL (US)

( * ) Notice: Subject to any disclaimer, the term of this patent is extended or adjusted under 35 U.S.C. 154(b) by 0 days.

(21) Appl. No.: 09/559,477

(22) Filed: Apr. 27, 2000

(51) Int. Cl.⁷ .................................................. B62D 7/18
(52) U.S. Cl. .................................................. 280/93.512
(58) Field of Search ...................... 280/93.512, 93.502, 280/93.51, 93.511

(56) References Cited

U.S. PATENT DOCUMENTS 1,932,340 A * 10/1933 Goltry ................... 280/93.512
5,624,011 A * 4/1997 White et al. ................. 188/329

* cited by examiner

*Primary Examiner*—Eric Culbreth
*Assistant Examiner*—Faye M. Fleming
(74) *Attorney, Agent, or Firm*—Cook, Alex, McFarron, Manzo, Cummings & Mehler, Ltd.

(57) ABSTRACT

A vehicle steering knuckle assembly for use in association with a vehicle steering axle assembly is shown to include an upper piece having a first king pin bore extending through it and a backbone piece removably connectable to the first piece. The backbone has a second king pin bore extending through it. The upper piece has an integral steering arm and a pad through which is machined a steering ball taper. The lower piece has an integral tie rod and a pad through which is machined a tie rod ball taper. Because the two pieces are removable from each other, the steering knuckle can be assembled and serviced while a king pin is retained in place in an axle beam.

50 Claims, 7 Drawing Sheets

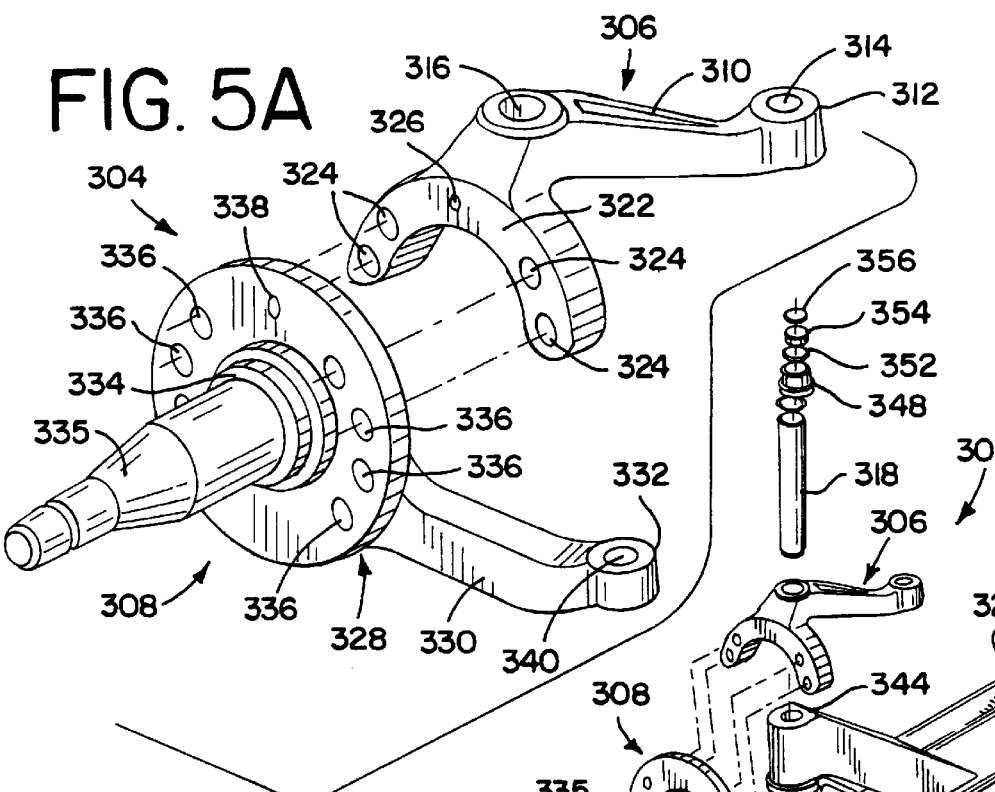
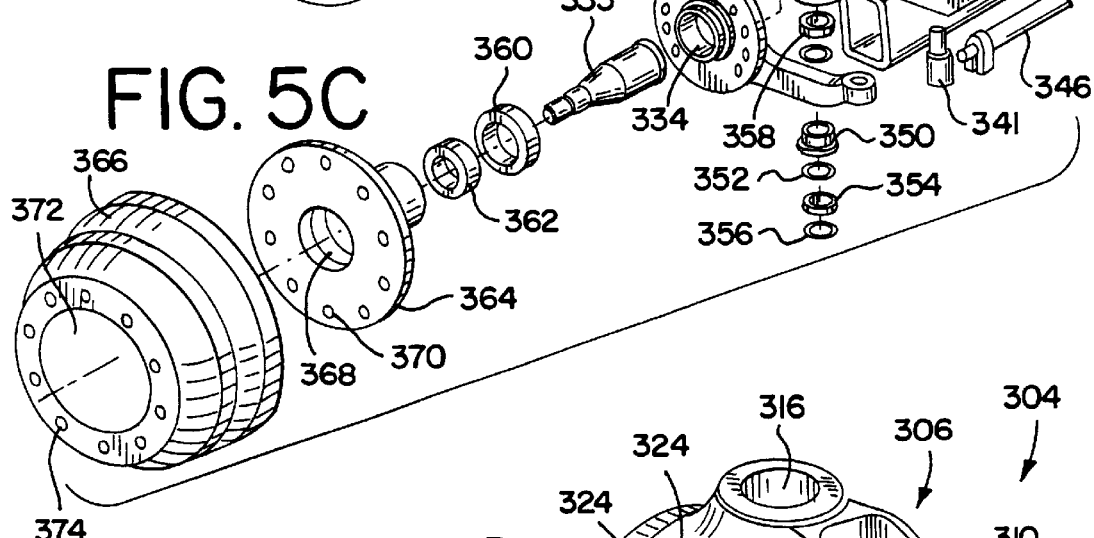
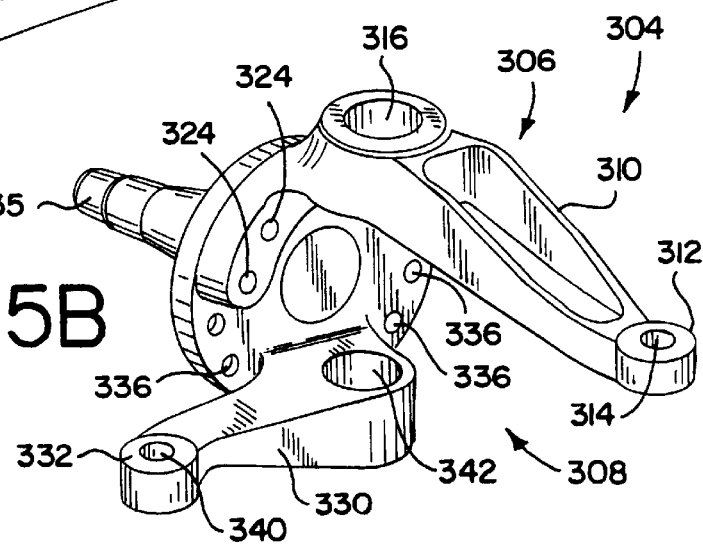

FIG. 6A
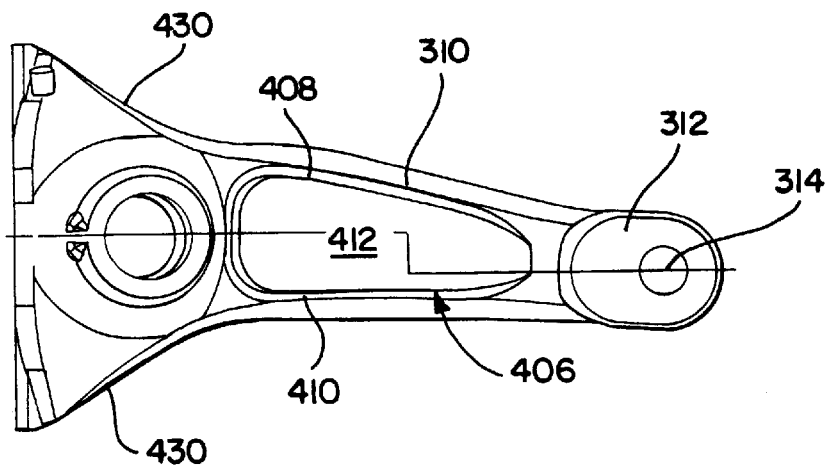
FIG. 6B
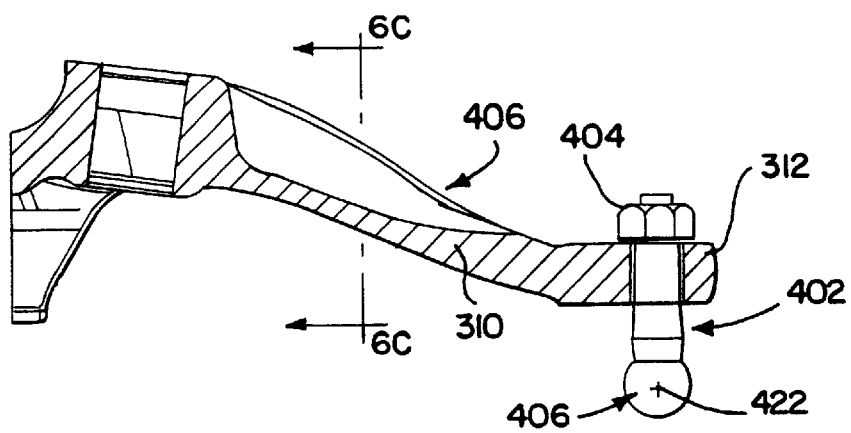
FIG. 6C
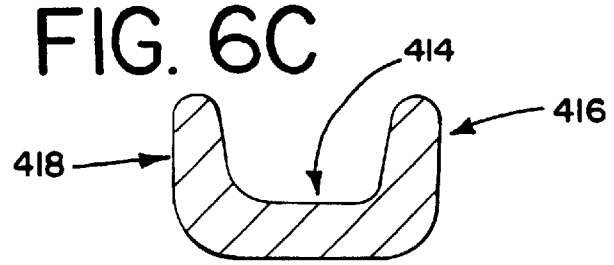
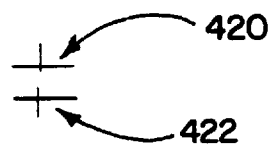

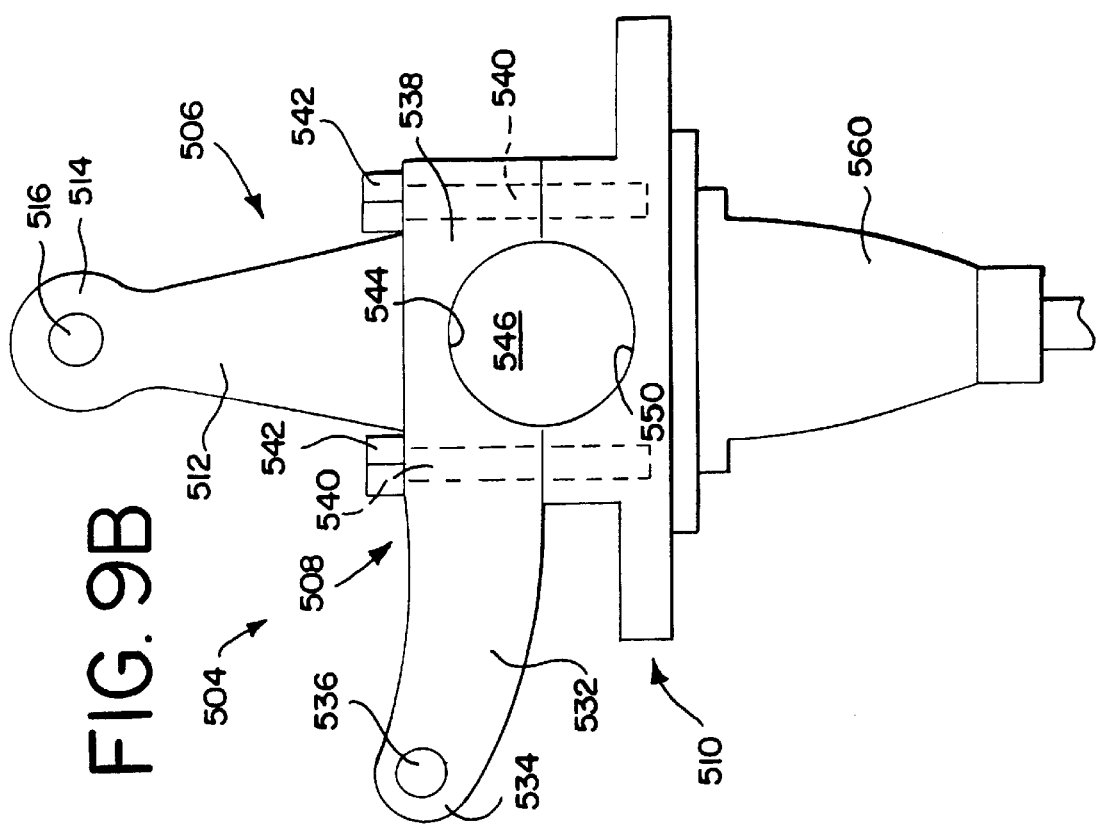

STEERING KNUCKLE

FIELD OF THE INVENTION

The present invention relates generally to vehicle steering axle assembly components and more particularly to a new and improved steering knuckle for vehicle steering axles.

BACKGROUND OF THE INVENTION

Steering knuckles have been used in vehicles for quite some time. Steering knuckles are a component part of vehicle steering axle assemblies, including those axle assemblies used in automobiles and in commercial light-, medium- and heavy-duty trucks. Steering knuckles are associated with the steering axle of such vehicles and function to provide a mount for the spindle or hub of a vehicle wheel. Generally, steering knuckles are controlled directly by the steering linkage system of vehicles.

FIG. 1 illustrates a typical vehicle steering axle assembly generally designated by reference numeral 20 having a plurality of component parts. Steering axle assembly 20 includes an axle beam 22 that extends laterally across a vehicle. At its end portion, axle beam 22 includes a king pin bore 24.

Vehicle steering axle assembly 20 also includes a steering knuckle/spindle 28 having a steering knuckle portion 30 with an integrally forged spindle portion 32. Steering knuckle portion 30 includes upper and lower king pin bores 34, 36, which are coaxially aligned. Steering knuckle portion 30 also includes a steering arm mounting bore 38 and a tie rod arm mounting bore 40.

As shown, a steering linkage system of the vehicle typically includes a steering arm 42 that is connected to steering knuckle/spindle 28 when an end of the steering arm is received and fastened in steering arm mounting bore 38 by a fastener assembly 44. A draglink 46, at one end, is connected to steering arm 42 by a fastener assembly 47. The other end of draglink 46 is connected to a steering control box (not shown) for effectuating steering control of the vehicle.

As further shown, conventional steering linkage systems also include a tie rod arm 48 that is connected to steering knuckle/spindle 28 when an end of the tie rod arm is received and fastened in tie rod arm mounting bore 40 by a fastener assembly 50. Tie rod arm 48 converts torque to a tie rod end 52, which is connected thereto. Tie rod end 52 includes the ball portion of the tie rod linkage and transfers force to a crosstube 54, which is connected thereto. Crosstube 54 connects to a tie rod end associated with another steering knuckle positioned on the opposite side of the vehicle at the opposite end of axle beam 22 and transmits a force between the two wheel ends. This allows steering to be effectuated on both sides of the vehicle. Preferably, crosstube 54 has an adjustable thread to set front axle toe to a specified amount.

A king pin 56 is also included to attach steering knuckle/spindle 28 to axle beam 22. King pin 56 defines a steering axis pivot for vehicle steering axle assembly 20. King pin 56 extends through the upper and lower king pin bores 34, 36 of steering knuckle/spindle 28 and through the king pin bore 24 of axle beam 22. As shown, a bushing 58 is positioned between the inside surface of king pin bore 34 and king pin 56. Similarly, a bushing 60 is positioned between the inside surface of king pin bore 36 and king pin 56. Bushings 58, 60 permit steering knuckle/spindle 28 to pivot about king pin 56 during vehicle steering. As further shown, a gasket 62, a cap 64, multiple capscrews 66 (one being shown at each end) and a grease fitting 68 are included for each of the upper and lower king pin bores 34, 36 of steering knuckle/spindle 28.

Still referring to FIG. 1, a plurality of shims 70 are typically included to establish the desired spacing between steering knuckle/spindle 28 and axle beam 22 when the parts are assembled. Furthermore, several draw keys 72 are also typically included to hold king pin 56 in place in axle beam 22 during operation. King pin 56 includes notches 73 for receiving draw keys 72. Furthermore, axle beam 22 includes draw key holes (not shown). It will be appreciated by those skilled in the art that king pin 56 would slidably move freely within king pin bore 24, if not for draw keys 72 holding it in place.

As further shown, the spindle portion 32 of steering knuckle/spindle 28 is blended and/or tapered at its root where it integrally connects with the steering knuckle portion 30 of the steering knuckle/spindle. The blended root construction increases the stress tolerance of spindle portion 32. Due to high bending stresses resulting from side loads during vehicle cornering, spindle portion 32 must typically be constructed of a high strength, premium steel. In the case where an integrally forged spindle 32 is used, the entire steering knuckle/spindle 28 is forged from high strength steel.

Still referring to FIG. 1, a wheel hub 74 having a centrally disposed wheel hub bore 76 is positioned over spindle portion 32 of steering knuckle/spindle 28 and secured in that position so that the spindle portion extends through the wheel hub bore. Wheel hub 74 allows for mounting of the vehicle wheel (not shown), which is positioned on the end of axle assembly 20 shown in FIG. 1. A cylindrical brake drum 78 having a centrally disposed brake drum bore 80 is positioned over wheel hub 74 and secured in that position. Brake drum 78 allows the brake shoes (not shown) to press against it, causing friction, which, in turn, stops rotation of the vehicle wheel positioned on its end of the steering axle assembly.

FIG. 2 illustrates the assembly and/or service of a conventional steering knuckle 28 to an axle beam 22 with a king pin 56. FIG. 2 is included herein to illustrate some of the problems associated with the assembly and service of conventional steering axle assemblies 20. The present invention completely eliminates those problems.

As shown in FIG. 2, and referring also to FIG. 1, the upper and lower kingpin bores 34, 36 of steering knuckle/spindle 28 must first be brought into registration with the kingpin bore 24 of axle beam 22. King pin 56 is then inserted through bore 34, bore 24 and bore 36 and held in place in axle beam 22 by draw keys 72.

Because their steering pivot axis (king pin) bores are positioned on the same piece, conventional steering knuckles, such as steering knuckle/spindle 28 shown in FIGS. 1 and 2, make use of a press in king pin impractical, and use of a king pin fixed within the axle beam impossible. Conventional steering knuckles require the axle beam king pin bore to allow the king pin to slide therein. As such, the axle beam king pin bore provides for a loose fit to allow the king pin to be inserted through it during assembly and service. This loose fit is a leading reason for failure of the axle beam. In particular, sliding movement of the king pin within the axle beam king pin bore over time can cause wear in that bore and cause the fit to loosen further than desired. Additionally, moisture can enter the cylindrical space between the king pin and the axle beam king pin bore, causing the king pin to be frozen in place and incapable of being removed. Under such circumstances, the steering knuckle cannot be serviced, absent practical destruction of same. In particular, the steering knuckle/spindle cannot be removed from the king pin when the king pin is frozen or otherwise stuck in the axle beam king pin bore.

Conventional steering knuckles also require draw keys to hold the king pin in place in the axle beam. The use of draw keys increases the components of the steering axle assembly, which, in turn, adds cost and weight to the assembly. In the case of commercial vehicles, this additional weight translates into reduced payload capacity.

Another deficiency of conventional steering knuckles is that any desired vertical spacing between the upper and lower sections of the steering knuckle and the end of axle beam must be provided by shims or similar components. These additional components add weight and cost to the steering axle assembly, which, in the case of commercial vehicles, translates into reduced payload capacity.

Still another deficiency of conventional steering knuckles is that they do not allow for alignment adjustment when fitting to the end of an axle beam.

Another deficiency of conventional steering knuckles is that the knuckle king pin bores and the axle beam king pin bores must all be precision-machined so that they are coaxially aligned when positioned in registration with each other. Without precision-machined bores, the king pin cannot be inserted through the bores and removed from them, as necessary, during assembly and service. In a related manner, the bores must be precision aligned during assembly and service of the steering axle assembly. These stringent requirements make the assembly and service processes for the steering axle assembly cumbersome.

As described above, those conventional steering knuckles that have an integrally forged spindle typically must be constructed in their entirety of high strength, premium steel due to the bending stress caused by side loads resulting from vehicle cornering. The steel used is relatively expensive and is difficult to machine, which further increases the manufacturing costs of those steering knuckles. Furthermore, those steering knuckles typically must have a blended root to accommodate the bending stress. The blended root conventionally has stringent demands on its surface finish, else its useful life is compromised. As a result of the stringent requirements, the manufacturing process is typically difficult to carry out and requires a substantial amount of time and labor which translates into relatively expensive manufacturing costs.

Another deficiency of conventional steering knuckles is that they typically include steering arms and tie rod arms that must be fastened thereto with a plurality of separate machined interfaces and fasteners devoted exclusively to fastening the arms to the knuckle. Manufacturing and assembly of these components adds cost and weight. Furthermore, use of separate steering arms and tie rod arms can create packaging problems for the steering axle assembly. In particular, conventional steering knuckles that have separate steering arms and tie rod arms cannot ordinarily be used with so-called fabricated axle beams, which are made of sheet metal.

Yet another deficiency of conventional steering knuckles is that they are difficult to machine. Most notably, conventional steering knuckles require multiple clampings to carry out the many machining operations. This increases the cost associated with their manufacture.

In light of the foregoing, it is desirable to design a vehicle steering axle steering knuckle that will overcome one or more of the above-identified deficiencies of conventional steering knuckles.

It is also desirable to design a steering knuckle for use in association with a vehicle steering axle that facilitates the assembly and service problems associated with conventional steering knuckles.

It is further desirable to design a steering knuckle that reduces the cost and weight associated with the manufacture and assembly of conventional steering knuckles.

These and other objects of the preferred forms of the invention will become apparent from the following description. It will be understood, however, that an apparatus could still appropriate the invention claimed herein without accomplishing each and every one of these objects, including those gleaned from the following description. The appended claims, not the objects, define the subject matter of this invention. Any and all objects are derived from the preferred forms of the invention, not necessarily the invention in general.

SUMMARY OF THE INVENTION

The present invention is directed to a vehicle steering knuckle for use in association with a vehicle steering axle assembly. The steering knuckle of the present invention includes a first piece having a first steering pivot axis bore extending through it and a second piece removably connectable to the first piece. The second piece has a second steering pivot axis bore extending through it.

There are several additional novel features and aspects of the present invention. Those features and aspects are described in the following description.

BRIEF DESCRIPTION OF THE DRAWINGS

In the following detailed description, reference will frequently be made to the following drawings, in which like reference numerals refer to like components, and in which:

FIG. 5A is an exploded front perspective view illustrating a third embodiment of a steering knuckle constructed in accordance with the principles of the present invention;

FIG. 5B is a rear perspective view illustrating this third embodiment of the steering knuckle;

FIG. 5C is an exploded view illustrating this third embodiment of the steering knuckle, along with other components of a vehicle steering axle assembly, to depict the assembly of the vehicle steering axle component parts;

FIG. 6A is a top view partially in section illustrating a steering arm and king pin bore for use with a steering knuckle constructed in accordance with the principles of the present invention;

FIG. 6B is a side view partially in section illustrating the steering arm and king pin bore shown in FIG. 6A and further illustrating a steering ball connected thereto;

FIG. 6C is a sectional view of the steering arm shown in FIG. 6A taken along line 6C—6C of FIG. 6B;

FIG. 9A is a top view illustrating a fourth embodiment of a steering knuckle constructed in accordance with the principles of the present invention; and FIG. 9B is a bottom view illustrating this fourth embodiment of the steering knuckle.

DETAILED DESCRIPTION OF THE PREFERRED EMBODIMENTS

Figure 2:
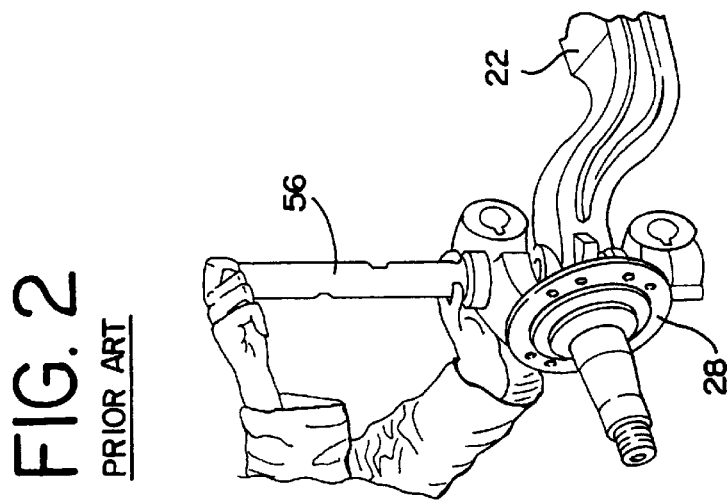
FIG. 2 is a perspective view illustrating the assembly of a conventional steering knuckle to a vehicle steering axle assembly.
Figure 1:
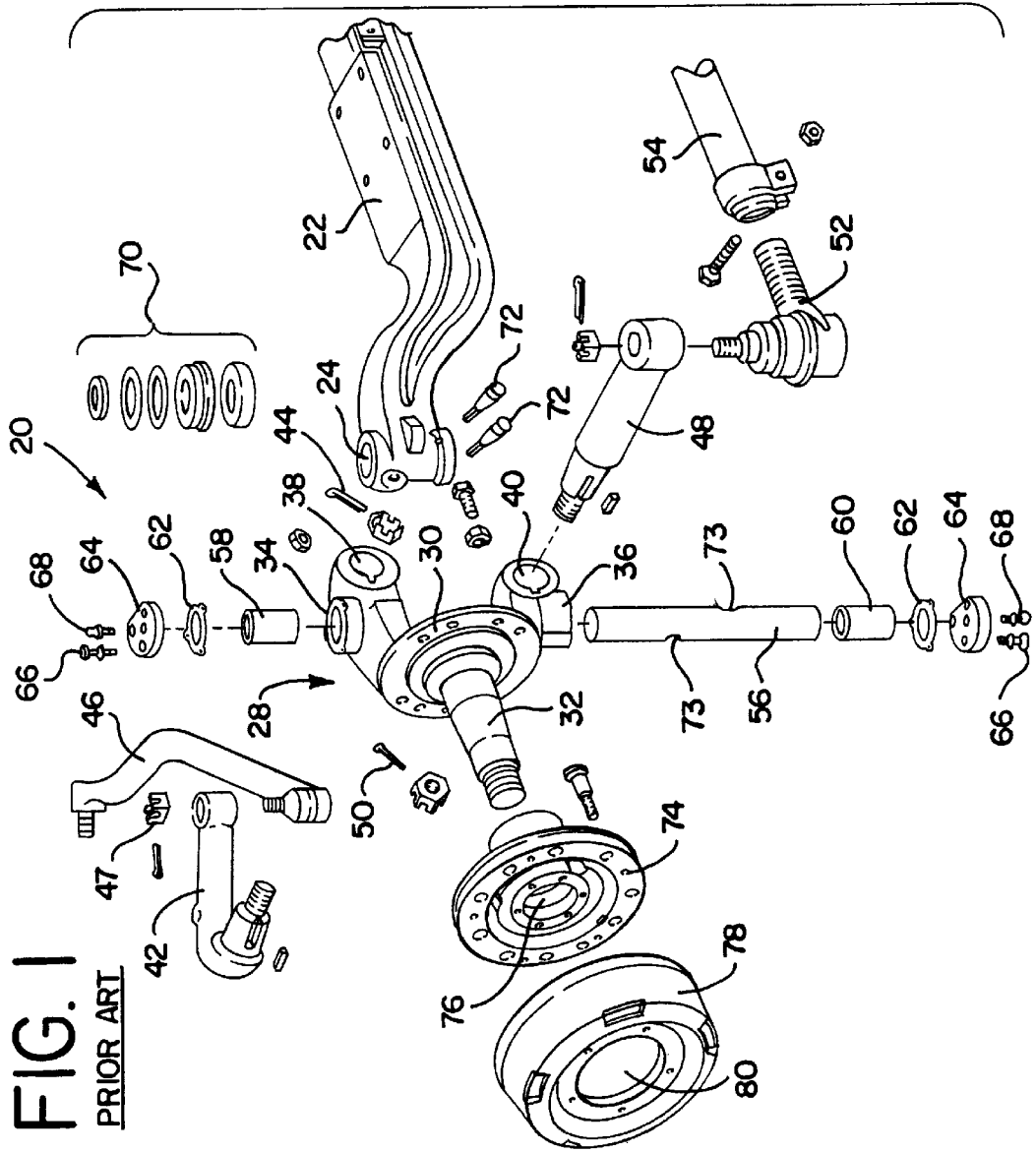
FIG. 1 is an exploded perspective view illustrating a vehicle steering axle assembly having a conventional steering knuckle.
Figure 3A:
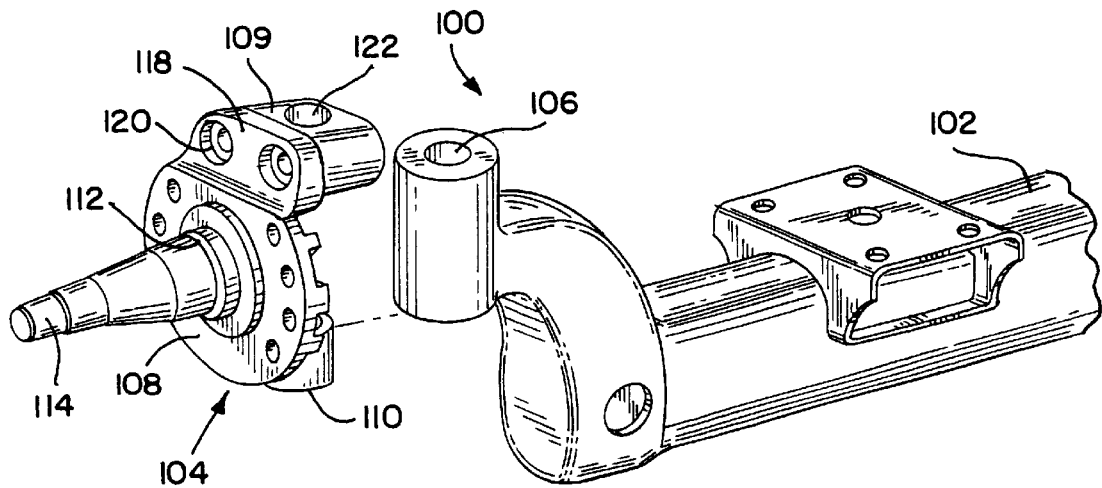
FIG. 3A is a partially exploded perspective view illustrating a first embodiment of a steering knuckle constructed in accordance with the principles of the present invention, along with a vehicle steering axle beam.
Figure 3B:
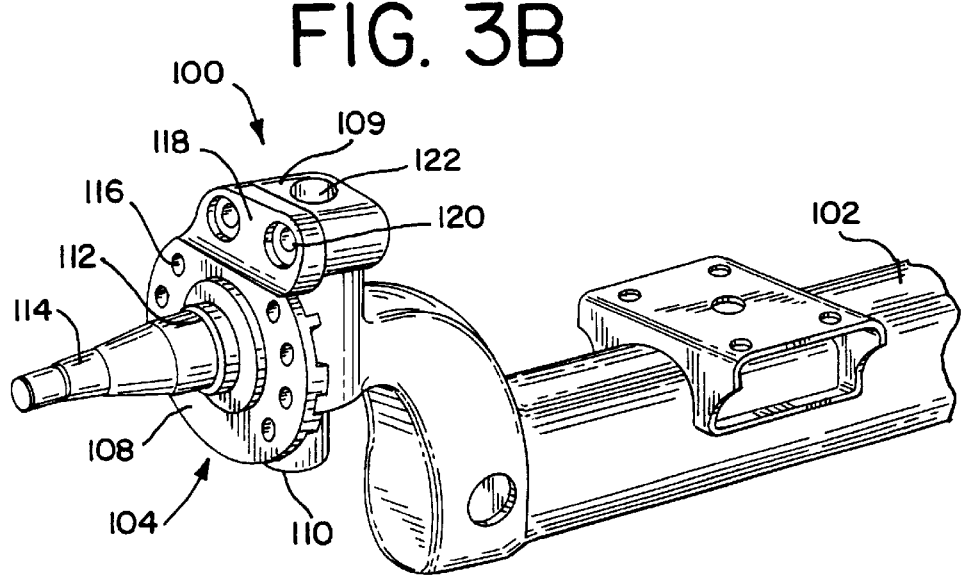
FIG. 3B is a perspective view illustrating this first embodiment of the steering knuckle and shows the knuckle positioned at one end of the depicted vehicle steering axle beam for assembly thereto.

FIGS. 3A and 3B illustrate a vehicle steering axle assembly 100 having a vehicle steering axle beam 102 and a steering knuckle 104. Axle beam 102 includes a steering pivot axis (king pin) bore 106 at each end adapted to accommodate a king pin (not shown) press-fitted or welded therein. Alternatively, the steering pivot axis (i.e., king pin) can be integrally formed with axle beam 102, in which case steering pivot axis bore 106 would not be needed. Only one end of axle beam 102 is illustrated in FIGS. 3A and 3B.

Steering knuckle 104 includes a first piece 108 forming a backbone for the steering knuckle and a second piece 109 forming a mount for the steering arm components. The steering knuckle first piece 108 includes an integrally formed steering pivot axis bore 110 and a centrally disposed bore 112 for receiving a removable, press-in spindle 114. Alternatively, spindle 114 can be integrally formed with steering knuckle first piece 108.

Steering knuckle first piece 108 further includes circumferentially disposed bores 116 to enable connection with a foundation brake assembly (not shown). Steering axis first piece 108 also includes a second piece mounting pad 118 preferably having bores 120 extending through it. Bores 120 allow steering knuckle second piece 109 to be removably connected to steering knuckle first piece 108. Although not shown, it will be appreciated that steering axis first piece 108 provides means for incorporating use of a tie rod assembly.

As shown, steering knuckle second piece 109 includes a steering pivot axis bore 122 extending through it. It will be noted that inasmuch as steering knuckle first and second pieces 108, 109 are removable from each other, steering pivot axis bores 110 and 122, respectively, can be separated from each other.

Figure 4A:
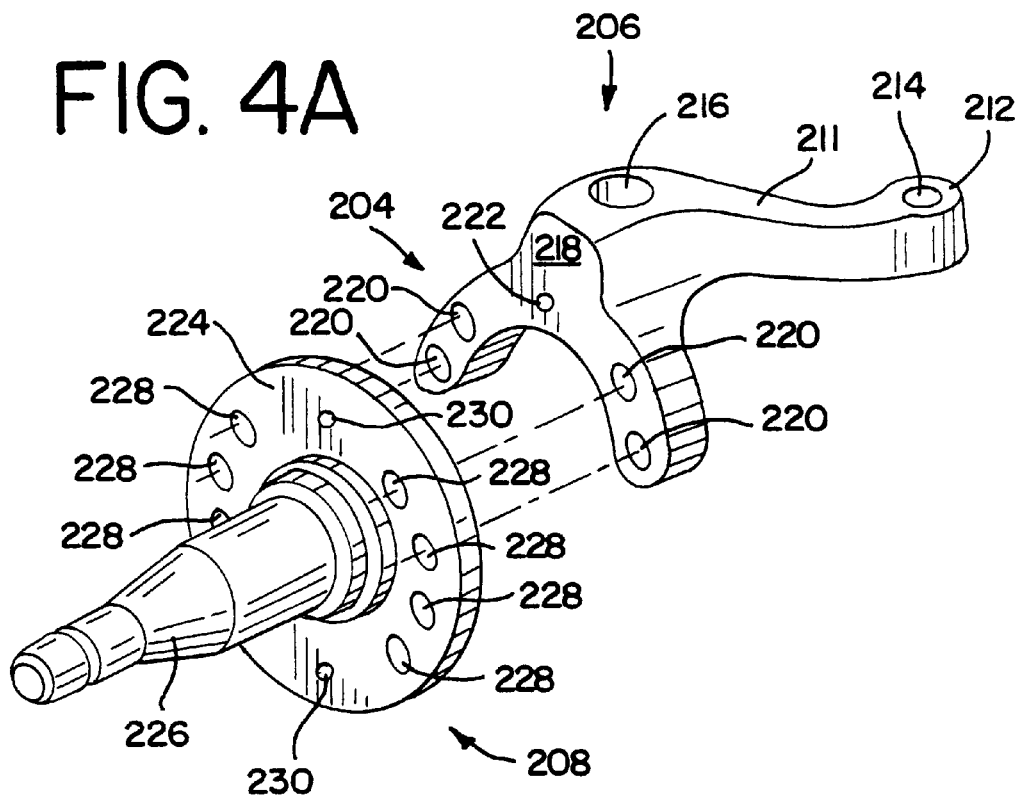
FIG. 4A is an exploded front perspective view illustrating some of the component parts of a second embodiment of a steering knuckle constructed in accordance with the principles of the present invention.
Figure 4B:
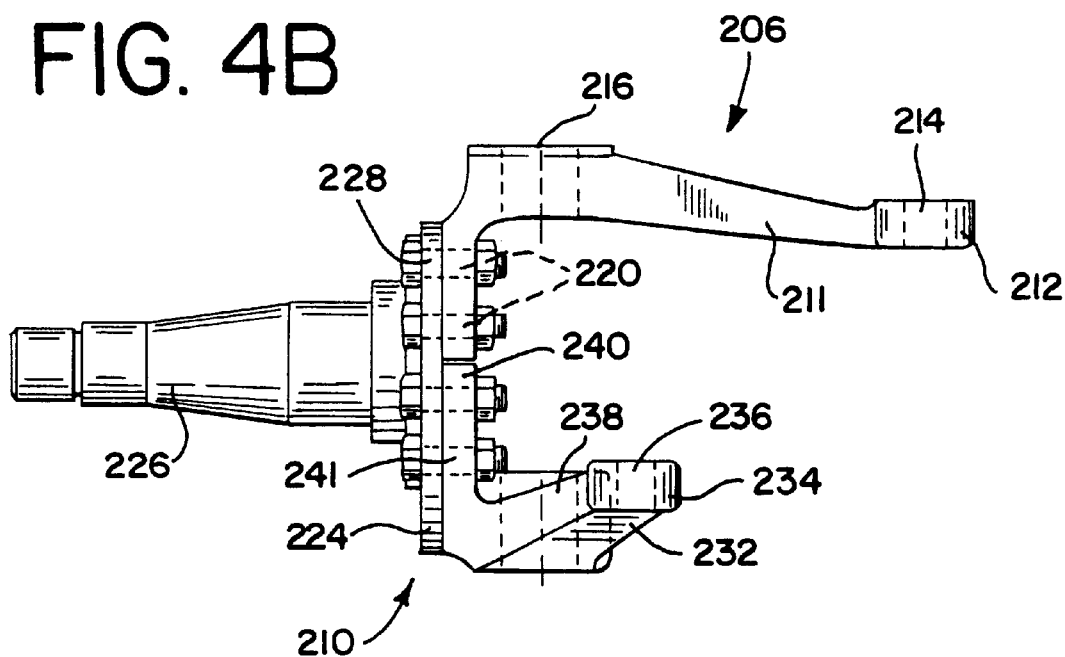
FIG. 4B is a side view illustrating this second embodiment of the steering knuckle.

FIGS. 4A and 4B illustrate a steering knuckle 204 that can form a component part of a vehicle steering axle assembly, such as those shown in the accompanying drawings. Steering knuckle 204 includes a first piece 206, a second piece 208 and a third piece 210.

As shown, first piece 206 includes an integral steering arm 211 having a pad 212. A steering ball taper 214 extends through pad 212 for permitting attachment of a steering ball (not shown) of the type conventionally used in vehicle steering axle assemblies. Steering ball taper 214 can be positioned at various locations on pad 212, as desired. First piece 206 also includes a steering pivot axis bore 216 extending through parent material integrally formed with steering arm 211. Steering pivot axis bore 216 is sized and adapted to accommodate a king pin and its associated bushings (not shown) for mounting the steering knuckle 204 to a vehicle steering axle beam. First piece 206 further includes an arcuate shaped mounting surface 218 having a plurality of arcuately disposed bores 220 extending through it and preferably at least one bore 222 extending into it. Bores 220 and 228 (shown on second piece 208) enable first piece 206 to be removably connected to second piece 208 by fasteners conventionally used in the art. Preferably, bores 220 and 228 are positioned so that they can be brought into registration with the bores used in vehicles to assemble the brakes to the wheel assembly. As such, the foundation brake fasteners can be used. The bore(s) 222 allow the first and second pieces 206, 208 to be secured to each other prior to installation of the foundation brake fasteners in the bores 220 and 228.

As further shown in FIGS. 4A and 4B, second piece 208 defines a spindle forging and includes a mounting flange portion 224 and a spindle portion 226. Second piece 208 is preferably constructed of a relatively lightweight forging. Its mounting flange portion 224 preferably includes a plurality of circumferentially disposed bores 228 and preferably at least two bores 230. Preferably, for every bore 220 of first piece 206, there is a corresponding bore 228 of second piece 208 positioned such that it can be brought into registration therewith. Those bores are also positioned such that they can be brought into registration with the bores used in vehicles to assemble the brakes to the wheel assembly. As such, the foundation brake fasteners can be used to assemble steering knuckle 204. The bores 230 allow the steering knuckle pieces 206, 208, 210 to be secured together prior to assembly of the larger foundation brake fasteners in the bores 228.

Still referring to FIGS. 4A and 4B, third piece 210 includes an integral tie rod arm 232 having a pad 234. A tie rod ball taper 236 extends through pad 234 for permitting attachment of a tie rod end (not shown) of the type conventionally used in vehicle steering axle assemblies. Tie rod ball taper 236 can be positioned at various locations on pad 234, as desired, such as to adjust for different ackerman geometries resulting from different wheel bases. Third piece 210 also includes a steering pivot axis bore 238 extending through parent material integrally formed with tie rod arm 232. Steering pivot axis bore 238 is sized and adapted to accommodate a king pin and its associated bushing (not shown) for mounting the steering knuckle 204 to a vehicle steering axle beam. Third piece 210 further includes an arcuate shaped mounting surface 240, which similar to mounting surface 218 of first piece 206, has a plurality of arcuately disposed bores 241. Most of bores 241 enable third piece 210 to be removably connected to second piece 208 by fasteners conventionally used in the art. Preferably, those bores are positioned so that they can be brought into registration with the bores used in vehicles to assemble the brakes to the wheel assembly. As such, the foundation brake fasteners can be used to assemble steering knuckle 204. Preferably, at least one bore is designed to allow the second and third pieces 208, 210 to be secured to each other prior to installation of the foundation brake fasteners.

It will be noted that inasmuch as steering knuckle first and second pieces 206, 208 are removable from each other, and similarly inasmuch as steering knuckle second and third pieces 208, 210 are removable from each other, steering pivot axis bores 216, 238, respectively, can be separated from each other during assembly and/or service of steering knuckle 204.

FIGS. 5A, 5B and 5C illustrate a steering knuckle 304 that can form a component part of a vehicle steering axle assembly, such as vehicle steering axle assembly 305 shown in FIG. 5C. Steering knuckle 304 includes a first piece 306 and a second piece 308.

As shown, first piece 306 includes an integral steering arm 310 having a pad 312. A steering ball taper 314 extends through pad 312 for permitting attachment of a steering ball (not shown) of the type conventionally used in vehicle steering axle assemblies. Steering ball taper 314 can be positioned at various locations on pad 312, as desired. First piece 306 also includes a steering pivot axis bore 316 extending through parent material integrally formed with steering arm 310. Steering pivot axis bore 316 is sized and adapted to accommodate a king pin 318 and its associated bushings for mounting the steering knuckle 304 to a vehicle steering axle beam 320. First piece 306 further includes an arcuate shaped mounting surface 322 having a plurality of arcuately disposed bores 324 extending through it and preferably at least one bore 326 extending into it. Bores 324 enable first piece 306 to be removably connected to second piece 308 by fasteners conventionally used in the art. Preferably, bores 324 are positioned so that they can be brought into registration with the bores used for installation of the foundation brake fasteners. The bore(s) 326 preferably allow the first and second pieces 306, 308 to be secured to each other prior to installation of the larger foundation brake fasteners in the bores 324.

As further shown, second piece 308 defines a backbone 328 and includes an integral tie rod arm 330 having a pad 332 and a centrally disposed spindle retaining bore 334 sized and adapted to receive a press-in spindle pin 335 preferably constructed of high strength, premium steel. As shown, spindle pin 335 preferably includes a shoulder at its base for fitting into a counter bore (not shown) included within the backbone of knuckle 304. This arrangement prevents spindle pin 335 from walking out, should the press fitting fail.

Second piece 308 is preferably constructed of a ductile iron casting. Alternate constructions of second piece 308 include an aluminum casting. It can also be forged integrally with pin 335.

Backbone 328 preferably also includes a plurality of circumferentially disposed bores 336 and preferably at least one bore 338. Preferably, for every bore 324 of first piece 306, there is a corresponding bore 336 of second piece 308 positioned such that it can be brought into registration therewith. Those bores are also positioned such that they can be brought into registration with the bores used in vehicles to assemble the brakes to the wheel assembly. As such, the foundation brake fasteners can be used to assemble steering knuckle 304 and no additional fasteners are necessary. The bores 326, 338 allow the steering knuckle pieces 306, 308 to be secured together prior to installation of the foundation brake fasteners in the bores 324, 336.

As further shown, with respect to its integrally formed tie rod arm 330, second piece 308 further includes a tie rod ball taper 340 that extends through pad 332 for permitting attachment of a tie rod end 341. Tie rod ball taper 340 can be positioned at various locations on pad 332, as desired, such as for ackerman geometries used for various wheelbases. Second piece 308 also includes a steering pivot axis bore 342 extending through parent material integrally formed with tie rod arm 330. Steering pivot axis bore 342 is sized and adapted to accommodate king pin 318 and its associated bushings for mounting the steering knuckle 304 to vehicle steering axle beam 320.

It will be noted that inasmuch as steering knuckle first and second pieces 306, 308 are removable from each other, steering pivot axis bores 316, 342, respectively, can be separated from each other.

FIG. 5C illustrates vehicle steering axle assembly 305 having a plurality of component parts. Steering axle assembly 305 includes axle beam 320, which extends laterally across a vehicle. At its end portion, axle beam 320 includes a steering pivot axis bore 344.

Vehicle steering axle assembly 305 also includes a two-piece steering knuckle 304, which, as previously described, includes a steering arm 310 integrally formed with first piece 306 of the steering knuckle. Additional steering linkage system components (not shown) of the type conventionally used in vehicles and connected to steering arm 310 are typically included for effectuating steering control of the vehicle.

As further shown, tie rod arm 330, which is integrally formed with second piece 308 of steering knuckle 304, is connected to tie rod end 341. Tie rod arm 330 converts torque to its connected tie rod end 341. Tie rod end 341 includes the ball portion of the tie rod linkage and transfers force to a crosstube 346, which is connected thereto. Crosstube 346 connects to a tie rod end associated with another steering knuckle positioned on the opposite side of the vehicle at the opposite end of axle beam 320 and transmits a force between the two wheel ends. This allows steering to be effectuated on both sides of the vehicle. Preferably, crosstube 346 has an adjustable thread to set front axle toe to a specified amount.

King pin 318 is also included to attach steering knuckle 304 to axle beam 320. Because king pin 318 can be press-fit in bore 344 or even fixed therein, draw keys are not required and king pin 318 need not have draw key holes machined therein. King pin 318 defines a steering axis pivot for the vehicle steering axle. King pin 318 extends through the king pin bores 316, 342 of steering knuckle 304 and through the king pin bore 344 of axle beam 320.

As shown, a standard three-layer bushing 348 is positioned between the inside surface of king pin bore 316 and king pin 318. Similarly, a standard three-layer bushing 350 is preferably positioned between the inside surface of king pin bore 342 and king pin 318. Bushings 348, 350 preferably have a steel outer layer, a bronze middle layer and a resin inner layer. The resin layer is preferably acetal. Bushings 348, 350 permit steering knuckle 304 to pivot about king pin 318 during vehicle steering.

As further shown, an O-ring 352, a grease cap 354 and a retaining ring 356 are included for each of the king pin bores 316, 342 of steering knuckle 304. Further shown is a thrust bearing 358 that is included in the assembly to act as a bearing surface for axle beam 320 and carry vertical loads. As depicted, thrust bearing 358 preferably sits atop king pin bore 342 and reduces friction during rotation.

Still referring to FIG. 5C, spindle 335 is pressed into spindle retaining bore 334 of steering knuckle 304. The shoulder on spindle pin 335 fits into a counter-bore positioned on the rear of backbone 328. Two bearings 360, 362 are included, along with a wheel hub 364 and a brake drum 366. Wheel hub 364 has a centrally disposed wheel hub bore 368 and is positioned over spindle 335 of steering knuckle 304 and secured in that position by a retaining nut (not shown). Wheel hub 364 includes a plurality of circumferentially disposed bores 370 used to mount the vehicle wheel. Wheel hub 364 allows for mounting of the vehicle wheel (not shown), which is positioned on the end of axle assembly 305 shown in FIG. 5C.

Cylindrical brake drum 366 has a centrally disposed brake drum bore 372 and is positioned over wheel hub 364 and secured in that position. Brake drum 366 allows the brake shoes (not shown) to press against it, causing friction, which, in turn, stops rotation of the vehicle wheel associated with the drum. Brake drum 366 includes a plurality of circumferentially disposed bores 374 that can be brought into registration with bores 370 of wheel hub 364 during assembly.

The unique construction of the steering knuckles described herein allows the knuckles to be assembled and serviced with the king pin in place. It does not require removal of the king pin for assembly and/or service. This construction permits an axle beam construction wherein the king pin is fixed in the axle by press-fit or welding, or even where the king pin (or other steering pivot axis) is integrally formed with the axle. In light of this, draw keys are not needed to keep the king pin securely positioned in the axle beam. The construction further allows the brake foundation fasteners to be used when assembling the steering knuckle pieces together. As a result, little or no additional fasteners are needed to assemble the steering knuckle, so that extra weight is not added and extra cost is not incurred. Similarly, no extra labor is required to assemble the steering knuckle and, in fact, labor is saved because the pieces can slip over opposing ends of a steering pivot axis during assembly.

The unique construction further permits the steering knuckle backbone to be constructed of ductile iron and aluminum castings, instead of steel forgings. This material can be machined substantially faster to reduce manufacturing time, labor and cost.

The unique construction also allows a favorable preload in the bushings positioned within the steering pivot axis bores of the steering knuckle. This offset can be a few thousandths of an inch. As a result, "play" is eliminated and wear is reduced. Furthermore, the unique construction allows the bushings to self-align on the king pin about the Y (lateral) axis of the vehicle, and allows vertical adjustment between the steering pivot axis bores to permit the gap between such bores and the axle beam to be adjusted, as desired. This eliminates the shims ordinarily necessary to adjust that bore-to-beam gap when using conventional steering knuckles. The adjustability of the steering knuckle of the present invention is a built-in feature resulting from clearance built into its mounting bores used to connect the various pieces of the steering knuckle. This feature is such that it also will accommodate engineering tolerances.

The unique construction also features integrated steering arms and/or integrated tie rod arms made into the castings. As a result, the additional machined interfaces and fasteners necessary to assemble those arms are eliminated to reduce weight and also reduce manufacturing and assembly cost. This further translates into greater payload capacity, in the case of commercial vehicles. This also makes a more reliable product, because the steering knuckle and its integrated arms are homogenous. The use of integrated steering arms saves weight and packaging space. Packaging space is saved to the extent that fabricated axle beams made of sheet metal can be used. The use of integrated tie rod arms provides for a more reliable bearing surface for the weight of the vehicle. In particular, the construction of the backbone provides a homogenous load path for vertical loads from the spindle to the axle beam. Another unique aspect of the present invention is that the use of the integrated steering arms and/or tie rod arms with their respective machining pads permits them to be machined in different locations, which allows for different so-called ackerman configurations. Use of a so-called Morse taper, which is common with conventional steering knuckles to mount tie rod arms of various geometries, is unnecessary.

The unique construction also, in some embodiments, uses a lower steering pivot axis bore that is integrally formed with the backbone. This integral bore provides a safety feature in case of failure.

To the extent the unique construction of this invention permits use of a press-in spindle pin, it allows for adapting to a broad variety of bearing groups. The spindle pin can be pressed out for service in the field, and in this configuration has proven more dependable than pins made from the same forging as a steering knuckle. Use of a press-in spindle pin also permits the steering knuckle backbone to be constructed of a material less expensive than the high strength, premium steel used for the spindle pin. For example, the backbone of the steering knuckle can be constructed of aluminum or ductile iron to reduce material and machining costs. Use of a press-in spindle pin further does not require a blended root construction, as typically required by those spindle pins that are integrally formed with the steering knuckle. As such, the stringent manufacturing requirements associated with the integrally formed spindle pins are eliminated, and material and manufacturing costs are reduced.

Manufacture of steering knuckles constructed in accordance with the principles of the present invention is easier and less expensive than manufacture of conventional steering knuckles. In particular, the multi-piece design provides for optimum castings, which can be poured with no cores to reduce manufacturing costs. Furthermore, the steering knuckle pieces can be more easily machined, particularly because they are preferably constructed of castings. In particular, each piece need only be clamped once, and all machining operations can be carried out on one side. To the contrary, conventional steering knuckles need to be clamped in several orientations to perform all machining operations. Ordinarily, conventional steering knuckles must be assembled in an eight- or nine-station assembly process.

Other novel aspects of the present invention are shown in the remaining figures and described herein. FIGS. 6A–6B illustrate the steering arm 310 and its integrally formed king pin bore shown in FIGS. 5A–5C. Although this steering arm is only shown in the figures as being used in that particular embodiment, it will be appreciated that this steering arm can advantageously be used in other steering knuckles constructed in accordance with the principles of the present invention. Among others, it can be used in those embodiments shown herein. It will be appreciated that steering arm 310 can also be used in other steering knuckles, including conventional steering knuckles.

As shown, steering arm 310 includes machining pad 312 and steering ball taper 314, which were previously described. A steering ball 400 having a tapered stud 402 is attached to steering arm 310 through steering ball taper 314 by way of a fastener 404. Steering knuckle first piece 304 also includes steering pivot axis bore 316 for accommodating a king pin.

As further shown in FIGS. 6A–6B, and as also shown in FIG. 5C, steering arm 310 includes a centrally located channel-like section 406 having side walls 408, 410 that taper upwards as they extend from the distal end of the channel section to its proximal end and a bottom wall 412 that remains at a relatively consistent grade throughout that same area. As shown in FIG. 6C, within the channel-like section 406, steering arm 310 has a U-shaped cross section with a web 414 defined by bottom wall 412 and flanges 416, 418 defined by side walls 408,410. The channel-like section 406 reduces the weight of steering arm 310, which translates into greater payload capacity for commercial vehicles.

With this U-shaped cross section, those skilled in the art will appreciate that steering arm 310 can be designed so that its shear center 420 is below web 414. FIG. 6B shows that steering arm 310 is optimally designed such that the center 422 of steering ball 400 is offset below web 414 of channel-like section 406. In a preferred manner, and as illustrated in FIG. 6C, the shear center 420 of steering arm 310 is positioned coincident, or relatively close thereto, with the center 422 of steering ball 400. This translates into less torsional force being applied to steering arm 310 by steering ball 400. As a result of this unique geometry, steering arm 310 can be substantially lighter than the steering arms traditionally used in conventional steering knuckles.

Figure 7:
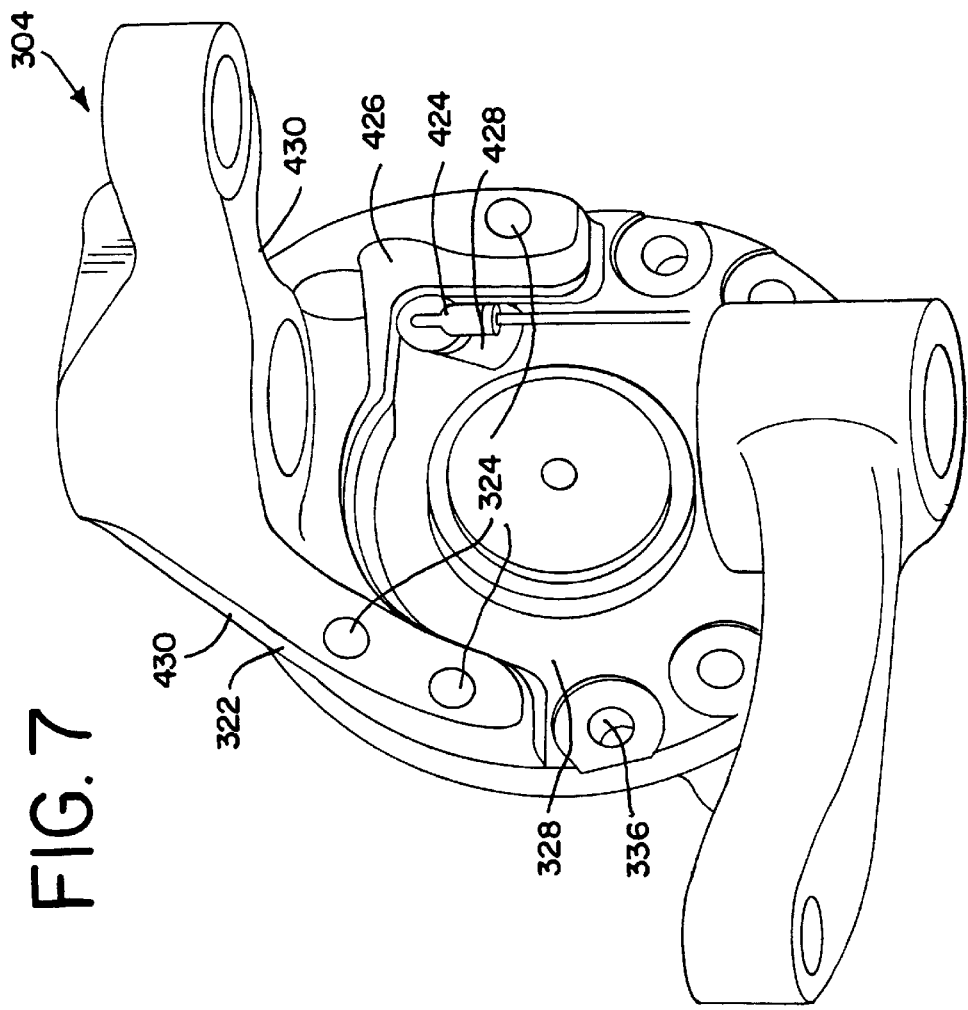
FIG. 7 is a rear view illustrating the third embodiment of the steering knuckle, along with an anti-lock brake sensor positioned therein.

FIG. 7 illustrates steering knuckle 304 shown in FIGS. 5A–5C. Although the unique aspects of the present invention now highlighted are only shown as being incorporated in one of the steering knuckle embodiments shown herein, it will be appreciated that this steering arm can advantageously be used in other steering knuckles constructed in accordance with the principles of the present invention, including the others shown herein.

As shown, an anti-lock brake (abs) sensor 424 is shown as being inserted within one of the bores 336 of the backbone 328 of steering knuckle 304. A brake foundation fastener is not installed in that bore. Mounting portion 322 of first piece 306 includes a notch 426 to provide clearance for abs sensor 424. Furthermore, the thickness of backbone 328 is preferably tailored to form a cavity 428 adapted to accommodate abs sensor 424.

When the bore 336 in which abs sensor 424 is inserted and the thickness of backbone 328 are tailored properly, use of a bushing for the abs sensor is unnecessary. This is most practical when backbone 328 is constructed of a casting, because it is then thick enough to house sensor 424.

Referring to FIGS. 6A and 7, steering arm 310 includes gussets or ribs 430 positioned on opposing sides thereof. Gussets 430 are positioned between the mounting portion 322 of first piece 306 and the proximal end of channel-like section 406. Gussets 430 flare outwards as they extend towards mounting portion 322 so that the parent material of steering arm 310 is thicker at the mounting portion 322 than it is throughout the channel-like section 406. Gussets 430 distribute and reduce the peak stresses imparted by loads exerted on steering arm 310 due to forces generated by steering ball 400. As a result, steering arm 310 can have an even lighter weight.

FIG. 7 also illustrates the location of the three tapped bores 324 for first piece 306 that are in registration with the bores 336 of backbone 328 through which the foundation brake fasteners are inserted. In this preferred aspect, the screw threads are tapped directly into the casting. This direct tapping eliminates the need for hex nuts and washers, which reduces cost and weight. Also, assembly of the brakes is facilitated because all assembly tasks can be performed on the wheel side of the steering knuckle.

Figure 8:
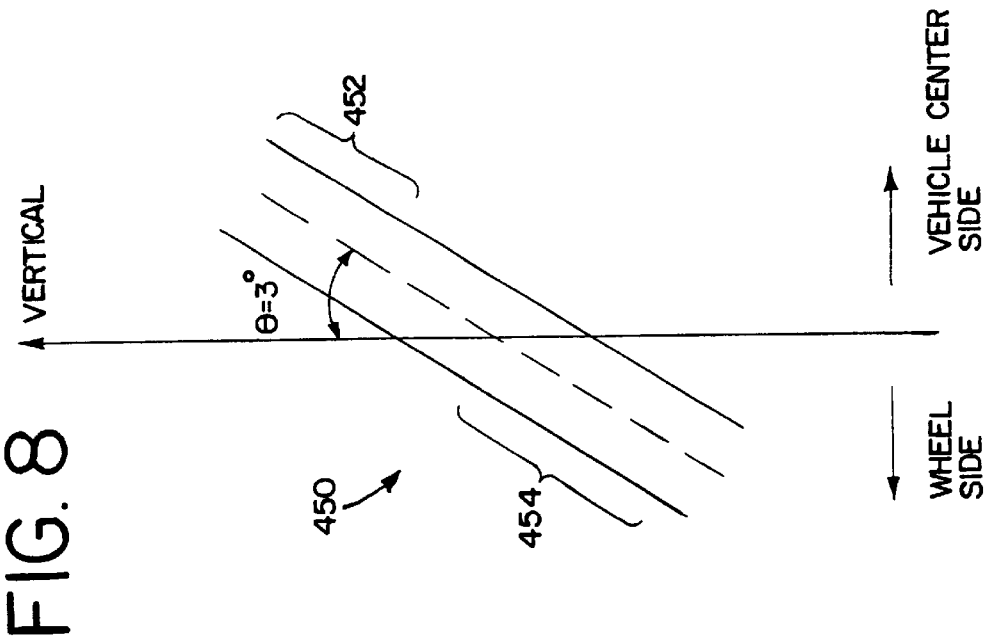
FIG. 8 is a diagrammatic view illustrating a preferred orientation of a tie rod ball taper used in association with a steering knuckle constructed in accordance with the principles of the present invention.

FIG. 8 illustrates the preferred orientation of a tie rod ball taper 450 used in a steering knuckle constructed in accordance with the principles of the present invention. As shown, tie rod ball taper 450 is oriented such that its upper end 452 is closer to the vehicle center than its lower end 454. As a result, the draft of its associated tie rod arm is such that its associated tie rod ball is angled away from the rim, which yields more clearance between the tie rod end and the axle beam at full wheel cut. Conversely, the lower end 454 is closer to the vehicle wheel on that side of the vehicle than upper end 452. In its most preferred orientation, tie rod ball taper 450 is oriented at a three degree angle to the vertical to yield approximately one-quarter inch more clearance than a vertically oriented tie rod ball taper.

FIGS. 9A and 9B illustrate a fourth embodiment of a steering knuckle 504 constructed in accordance with the principles of the present invention. Steering knuckle 504 includes a first piece 506, a second piece 508 and a third piece 510. As shown, first piece 506 includes an integrated steering arm 512 having a pad 514 and a steering arm ball taper 516 machined therein. First piece 506 further includes a mounting portion 518 for mounting the first piece to third piece 510. Mounting portion 518 includes mounting bores 520 to accommodate fasteners 522 for removable connection of first piece 506 with third piece 510. Mounting portion 518 further includes an arcuate shaped surface 524 to form part, and preferably half, of a king pin bore 526 for steering knuckle 504.

Second piece 508 includes an integrated tie rod arm 532 having a pad 534 with a tie rod ball taper 536 machined therein. Second piece 508 further includes a mounting portion 538 that includes mounting bores 540 in which fasteners 542 can be installed to permit removable connection of the second piece with third piece 510. Mounting portion 538 includes an arcuate shaped surface 544 that forms part, and preferably half, of a king pin bore 546 for steering knuckle 504.

Third piece 510 forms a backbone portion for steering knuckle 504. Third piece 510 includes an arcuately shaped surface 550 at its base to align with surfaces 524, 544 and form the two king pin bores 526, 546 for steering knuckle 504. A spindle 560 may be press fit into third piece 510, or alternatively integrally formed therewith.

While this invention has been described with reference to illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications would be recognized by those skilled in the art as an equivalent to one element or more of the following claims, and shall be covered by such claims to the fullest extent permitted by law.

What is claimed is:

1. A steering knuckle assembly for use in association with a vehicle steering axle assembly, comprising:
    a first piece having a first king pin bore extending through it;
    second piece removably connectable to the first piece, said second piece having a second king pin bore extending through it;
    a first king pin bushing installed within said first king pin bore; and
    a second king pin bushing installed within said second king pin bore.

2. The steering knuckle assembly of claim 1 wherein said first piece includes a plurality of first piece assembly bores, said second piece includes a plurality of second piece assembly bores, and said first piece assembly bores and said second piece assembly bores are machined to be aligned to permit said first piece to connected to said second piece.

3. The steering knuckle assembly of claim 2 wherein said first piece assembly bores are positioned on said first piece in a manner such that said first piece assembly bores are aligned with structure used for attachment of a brake assembly, and said second piece assembly bores are positioned on said second piece in a manner such that said second piece assembly bores are aligned with said structure used for attachment of said brake assembly.

4. The steering knuckle assembly of claim 2 wherein said first piece assembly bores are tapped and said second piece assembly bores are tapped.

5. The steering knuckle assembly for claim 1 wherein said first piece includes a first pre-assembly bore, and said second piece includes a second pre-assembly bore machined to be aligned with said first pre-assembly bore.

6. The steering knuckle assembly of claim 1 wherein said first king pin bore is not coaxially aligned with said second king pin bore when said second piece is properly and completely connected to said first piece.

7. The steering knuckle assembly of claim 1 wherein said first piece includes an integrated steering arm.

8. The steering knuckle assembly of claim 7 wherein said steering arm includes a steering arm bore machined to permit a steering ball to be connected to said steering arm.

9. The steering knuckle assembly of claim 8 wherein said steering arm includes a pad and said steering arm bore is machined through said pad.

10. The steering knuckle assembly of claim 7 wherein said steering arm includes a channel-like portion having a U-shaped section.

11. The steering knuckle assembly of claim 10 wherein said channel-like portion is designed and adapted to have a shear center positioned coincident with a steering ball to be connected to said steering arm.

12. The steering knuckle assembly of claim 1 wherein said second piece includes an integrated tie rod arm.

13. The steering knuckle assembly of claim 12 wherein said tie rod arm includes a tie rod arm bore machined to permit a tie rod ball to be connected thereto.

14. The steering knuckle assembly of claim 12 wherein said tie rod arm includes a machining pad.

15. The steering knuckle assembly of claim 14 wherein said machining pad is sufficiently large to permit said tie rod arm bore to be machined in a manner to accommodate different ackerman configurations, as desired.

16. The steering knuckle assembly of claim 15 wherein said tie rod arm bore is machined to permit said tie rod ball to be offset three degrees from a vertical plane.

17. The steering knuckle assembly of claim 12 wherein said tie rod arm has a draft to permit clearance of other vehicle components.

18. The steering knuckle assembly of claim 1 wherein said first and second pieces can be connected to each other such that said first and second king pin bores are vertically adjusted with respect to each other.

19. The steering knuckle assembly of claim 1 wherein said second piece includes a spindle pin bore.

20. The steering knuckle assembly of claim 19 wherein said spindle pin bore is machined to receive a press fit spindle pin.

21. The steering knuckle assembly of claim 1 wherein said second piece includes a portion tailored in thickness to accommodate an anti-lock brake sensor.

22. A steering knuckle assembly for use in association with a vehicle steering axle assembly, comprising:
   first piece having a first steering pivot axis bore extending through it;
   a second piece removably connectable to the first piece, said second piece comprising a backbone portion; and
   a third piece removably connectable to the second piece, said third piece having a second steering pivot axis bore extending through it.

23. The steering knuckle assembly of claim 22 wherein said first piece includes a plurality of first piece assembly bores, said second piece includes a plurality of second piece assembly bores, said third piece includes a plurality of third piece assembly bores, said first piece assembly bores and a first set of said second piece assembly bores are machined to be aligned to permit said first piece to be connected to said second piece, and said third piece assembly bores and a second set of said second piece assembly bores are machined to be aligned to permit said third piece to be connected to said second piece.

24. The steering knuckle assembly of claim 23 wherein said first piece assembly bores are positioned on said first piece in a manner such that said first piece assembly bores are aligned with structure used for attachment of a brake assembly, said second piece assembly bores are positioned on said second piece in a manner such that said second piece assembly bores are aligned with said structure used for attachment of said brake assembly, and said third piece assembly bores are positioned on said third piece in a manner such that said third piece assembly bores are aligned with said structure used for attachment of said brake assembly.

25. The steering knuckle assembly of claim 23 wherein said first piece assembly bores are tapped, said second piece assembly bores are tapped and said third piece assembly bores are tapped.

26. The steering knuckle assembly of claim 22 wherein said first steering pivot axis bore is not coaxially aligned with said second steering pivot axis bore when said steering knuckle assembly is completely assembled.

27. The steering knuckle assembly of claim 22 wherein said first piece includes an integrated steering arm.

28. The steering knuckle assembly of claim 27 wherein said steering arm includes a steering arm bore machined to permit a steering ball to be connected to said steering arm.

29. The steering knuckle assembly of claim 28 wherein said steering arm includes a pad and said steering arm bore is machined through said pad.

30. The steering knuckle assembly of claim 27 wherein said steering arm includes a channel-like portion having a U-shaped section.

31. The steering knuckle assembly of claim 30 wherein said channel-like portion is designed and adapted to have a shear center positioned coincident with a steering ball to be connected to said steering arm.

32. The steering knuckle assembly of claim 22 wherein said third piece includes an integrated tie rod arm.

33. The steering knuckle assembly of claim 32 wherein said tie rod arm includes a tie rod arm bore machined to permit a tie rod ball to be connected thereto.

34. The steering knuckle assembly of claim 32 wherein said tie rod arm includes a machining pad.

35. The steering knuckle assembly of claim 34 wherein said machining pad is sufficiently large to permit said tie rod arm bore to be machined in a manner to accommodate different ackerman configurations, as desired.

36. The steering knuckle assembly of claim 35 wherein said tie rod arm bore is machined to permit said tie rod ball to be offset three degrees from a vertical plane.

37. The steering knuckle assembly of claim 32 wherein said tie rod arm has a draft to permit clearance of other vehicle components.

38. The steering knuckle assembly of claim 22 wherein said steering knuckle assembly can be assembled such that said first and second pivot axis bores are vertically adjusted with respect to each other.

39. The steering knuckle assembly of claim 22 wherein said second piece includes a spindle pin bore.

40. The steering knuckle assembly of claim 39 wherein said spindle pin bore is machined to receive a press fit spindle pin.

41. The steering knuckle assembly of claim 22 wherein said second piece includes a portion tailored in thickness to accommodate an anti-lock brake sensor.

42. The steering knuckle assembly of claim 7 wherein said steering arm includes a portion defining steering arm gussets.

43. The steering knuckle assembly of claim 27 wherein said steering arm includes a portion defining steering arm gussets.

44. A vehicle steering axle assembly, comprising:
- a steering axle having a first end portion and a second end portion, the first end portion of said steering axle having a steering axle first king pin bore extending through it, and the second end portion of said steering axle having a steering axle second king pin bore extending through it;
- a first steering knuckle mounted on said first end portion of said steering axle, said first steering knuckle including a first steering knuckle first piece having a first steering knuckle first king pin bore extending through it, and a first steering knuckle second piece removably connected to the first steering knuckle first piece, said first steering knuckle second piece having a first steering knuckle second king pin bore extending through it;
- second steering knuckle mounted on said second end portion of said steering axle, said second steering knuckle including a second steering knuckle first piece having a second steering knuckle first king pin bore extending through it, and a second steering knuckle second piece removably connected to the second steering knuckle first piece, said second steering knuckle second piece having a second steering knuckle second king pin bore extending through it;
- a first king pin secured within said steering axle first king pin bore; and
- a second king pin secured within said steering axle second king pin bore.

45. The vehicle steering axle assembly of claim 44 wherein said first king pin is press-fit within said steering axle first king pin bore.

46. The vehicle steering axle assembly of claim 45 wherein said second king pin is press-fit within said steering axle second king pin bore.

47. The vehicle steering axle assembly of claim 44 wherein said first king pin is welded within said steering axle first king pin bore.

48. The vehicle steering axle assembly of claim 47 wherein said second king pin is welded within said steering axle second king pin bore.

49. The vehicle steering axle assembly of claim 44 wherein said first king pin is integrally forged within said steering axle first king pin bore.

50. The vehicle steering axle assembly of claim 49 wherein said second king pin is integrally forged within said steering axle second king pin bore.

* * * * *